United States Patent
Gadelrab et al.

(10) Patent No.: US 11,888,197 B2
(45) Date of Patent: Jan. 30, 2024

(54) DUAL SURFACE PROPERTY COMPOSITE FUEL CELL POLYMER ELECTROLYTE MEMBRANE

(71) Applicants: Robert Bosch GmbH, Stuttgart (DE); Massachusetts Institute of Technology, Cambridge, MA (US)

(72) Inventors: Karim Gadelrab, Boston, MA (US); Jonathan Mailoa, Cambridge, MA (US); Hejin Huang, Cambridge, MA (US); Alfredo Alexander-Katz, Cambridge, MA (US)

(73) Assignees: Robert Bosch GmbH, Stuttgart (DE); Massachusetts Institute of Technology, Cambridge, MA (US)

( * ) Notice: Subject to any disclaimer, the term of this patent is extended or adjusted under 35 U.S.C. 154(b) by 281 days.

(21) Appl. No.: 16/866,074

(22) Filed: May 4, 2020

(65) Prior Publication Data
US 2021/0344029 A1    Nov. 4, 2021

(51) Int. Cl.
| H01M 8/1051 | (2016.01) |
| H01M 8/1027 | (2016.01) |
| H01M 8/1039 | (2016.01) |

(52) U.S. Cl.
CPC ....... *H01M 8/1051* (2013.01); *H01M 8/1027* (2013.01); *H01M 8/1039* (2013.01)

(58) Field of Classification Search
CPC ............. H01M 8/1057; H01M 8/1027; H01M 8/1039; H01M 8/1051
See application file for complete search history.

(56) References Cited

U.S. PATENT DOCUMENTS

| 10,367,219 B2 | 7/2019 | Bae et al. | |
| 2008/0160351 A1* | 7/2008 | Felix | H01M 4/8668 429/492 |
| 2013/0029249 A1* | 1/2013 | Hamrock | C08G 75/23 429/492 |
| 2015/0155583 A1* | 6/2015 | Oldani | H01M 8/1055 252/184 |
| 2018/0145358 A1* | 5/2018 | Bae | H01M 8/1053 |

FOREIGN PATENT DOCUMENTS

WO    2010005267 A2    1/2010

OTHER PUBLICATIONS

A comparative study of the hydrated morphologies of perfluorosulfonic acid fuel cell membranes with mesoscopic simulations; Energy & Environmental Science vol. 1 | No. 2 | Aug. 2008 | pp. 197-312; Dongsheng Wu, Stephen J. Paddison, James A. Elliott (Year: 2008).*

(Continued)

*Primary Examiner* — Sarah A. Slifka
(74) *Attorney, Agent, or Firm* — Brooks Kushman P.C.

(57) ABSTRACT

A composite fuel cell polymer electrolyte membrane. The composite membrane includes a polymer electrolyte membrane base material including first and second inorganic particles. The first and second inorganic particles are interspersed within the polymer electrolyte membrane base material and each other. The first and second inorganic particles have first and second surface properties and the first surface property is different than the second surface property.

20 Claims, 4 Drawing Sheets

(56) References Cited

OTHER PUBLICATIONS

Di Noto, V. et al., "Effect of SiO2 on Relaxation Phenomena and Mechanism of Ion Conductivity of [Nation/(SiO2)x] Composite Membranes" Journal of Physical Chemistry B, vol. 110, 2006, pp. 24972-24986, DOI: 10.1021/jp0650331.

Donnadio, A. et al., "Double filler reinforced ionomers: a new approach to the design of composite membranes for fuel cell applications" Journal of Materials Chemistry A, vol. 3, 2015, pp. 23530-23538, DOI: 10.1039/c5ta07917a.

Kusoglu, A. et al., "New Insights into Perfluorinated Sulfonic-Acid Ionomers," Chemical Reviews, vol. 117, Jan. 23, 2017, pp. 987-1104, DOI: 10.1021/acs.chemrev.6b00159.

Maciejewski, H. et al., "Hydrophobic Materials Based on Fluorocarbofunctional Spherosilicates," Silicon, vol. 7, 2015. pp. 201-209, DOI: 10.1007/s12633-014-9264-5.

Safronova, E. Y., et al., "Nafion-type membranes doped with silica nanoparticles with modified surface," Solid Stat-Ionics, vol. 221, Jun. 29, 2012, pp. 6-10, DOI: 10.1016/j.ssi.2012.05.030.

Son, B. et al., "Study of morphological characteristics on hydrophilicity-enhanced SiO2/Nation composite membranes by using multimode atomic force microscopy," International Journal of Energy Research, vol. 43, 2019, pp. 4157-4169, DOI: 10.1002/er.4528.

Ying, Y.P. et al., "Silica-related membranes in fuel cell applications: An overview" International Journey of Hydrogen Energy, vol. 43, Jul. 21, 2018, pp. 16068-16084, DOI: 10.1016/j.ijhydene.2018.06.171.

Zhao, Y. et al., "Enhanced proton conductivity of the hybrid membranes by regulating the proton conducting groups anchored on the mesoporous silica," Journal of Power Sources, vol. 270, Jul. 27, 2014, pp. 292-303, DOI: 10.1016/j.ipowsour.2014.07.135.

\* cited by examiner

DUAL SURFACE PROPERTY COMPOSITE FUEL CELL POLYMER ELECTROLYTE MEMBRANE

TECHNICAL FIELD

The present disclosure relates to a dual surface property composite fuel cell polymer electrolyte membrane. The dual surface property components of the composite fuel cell polymer electrolyte membrane may include hydrophobic particles configured to hinder relaxations of a polymer backbone of a polymer electrolyte membrane base material within the composite at a high operating temperature range of the composite fuel cell polymer electrolyte membrane and hydrophilic particles configured to bind water at the high operating temperature range.

BACKGROUND

A Nafion membrane is an example of a perfluorosulfonic acid (PFSA) polymer generated by free radical initiated copolymerization of a perfluorinated vinyl ether sulfonyl fluoride co-monomer with polytetrafluoroethylene (PTFE). A Nafion membrane is a standard material for proton exchange membrane fuel cells due to its unique ion-transport capabilities, and high mechanical and chemical stability. These beneficial performance characteristics can only be maintained over a low operating temperature range (e.g. less than 100° C.). Raising the operating temperature above this relatively low range may activate modes of chain relaxation in the Nafion membrane. Activation of these modes of chain relaxation may disrupt the nanostructure of the Nafion polymer while causing membrane dehydration. Functioning of a Nafion membrane is also impaired at a low operating relatively humidity (e.g. less than 50%). However, the overall performance of the fuel cell may improve at higher temperatures and/or lower relative humidity levels. The benefits of increasing overall fuel cell performance at higher temperatures and/or lower relative humidity level has remained elusive due to degradation of the Nafion membrane under these operating conditions.

SUMMARY

According to one embodiment, a composite fuel cell polymer electrolyte membrane is disclosed. The composite membrane includes a polymer electrolyte membrane base material including first and second inorganic particles. The first and second inorganic particles are interspersed within the polymer electrolyte membrane base material and each other. The first and second inorganic particles have first and second surface properties and the first surface property is different than the second surface property.

In another embodiment, a composite fuel cell polymer electrolyte membrane is disclosed. The composite membrane includes a polymer electrolyte membrane base material including first and second inorganic particles. The first and second inorganic particles are commingled within the polymer electrolyte membrane base material to produce a confinement dimension between the first and second inorganic particles. The first and second inorganic particles have first and second surface properties and the first surface property is different than the second surface property.

In yet another embodiment, a polymer electrolyte membrane fuel cell is disclosed. The fuel cell includes an anode, a cathode and a polymer electrolyte membrane. The polymer electrolyte membrane is situated between the anode and cathode. The polymer electrolyte membrane includes a polymer electrolyte membrane base material including first and second inorganic particles. The first and second inorganic particles are interspersed within the polymer electrolyte membrane base material and each other. The first and second inorganic particles have first and second surface properties and the first surface property is different than the second surface property.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer"

includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" may be used herein to describe disclosed or claimed embodiments. The term "substantially" may modify any value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Proton exchange membranes fuel cells (PEMFCs) utilize polymer electrolyte membranes configured to operate in a relatively low temperature range not exceeding a threshold temperature (e.g. 80 to 90° C.) and a relatively high relative humidity (RH) range (e.g. greater than 50%). The polymer electrolyte membrane material may be an organic polymer electrolyte membrane material, which in turn may be a fluorinated polymer electrolyte membrane material. One type of fluorinated polymer electrolyte membrane material is a perfluorosulfonic acid (PFSA) polymer material. The PFSA polymer material may include an expanded polytetrafluoroethylene (ePTFE), sintered polytetrafluoroethylene (PTFE), and combinations thereof. The PFSA polymer material may be a Nafion branded membrane available from Chemours Co. Other non-limiting examples of PFSA polymer materials include Aquivion branded membranes available from Solvay S. A., 3M branded membranes available from 3M Co., Flemion and Aciplex branded membranes available from AGC Chemical, Gore branded membranes available from W. L. Gore & Associates, Inc., short side chain (SSC) PFSA membranes, and long side chain (LSC) PFSA membranes.

Nafion is a solid electrolyte material, which lends to relatively easy material handling and mass production. Other benefits of Nafion membranes include unique ionic transport capabilities (e.g. only protons cross over the Nafion membrane) and relatively high mechanical and chemical stability.

One or more of the benefits of the Nafion membrane may deteriorate when the operating temperature of the PEMFC exceeds the normal operating temperature range (e.g. the operating temperature exceeds 80 to 90° C.). These above-normal operating temperature conditions may cause structural relaxations in the Nafion membrane, thereby deteriorating the mechanical properties of the Nafion membrane. For example, the structural relaxations in a Nafion membrane including ePTFE may cause the ePTFE to partially detach from its support. The structural relaxations also may cause a reduction in the ionic conductivity of the Nafion due to dehydration. However, overall fuel cell performance may be improved by operating at a relatively higher temperature range and/or a relatively lower relative humidity than a normal operating range.

Considering the foregoing, what is needed is a membrane, such as Nafion, that can operate at a relatively higher temperature range and/or a relatively lower HR than a normal operating range so that cell performance improvements can be realized.

Different strategies have been proposed to extend membrane operating temperature ranges. These strategies include polymer blends, acid-base polymer membranes, or replacing water within the membrane with a relatively low volatility solvent. It has also been proposed to fill Nafion with hydrophilic silica nanoparticles (NPs). The hydrophilic silica NPs may be incorporated into Nafion to facilitate water binding through hydrogen bonding, thereby increasing overall water retention. Water clusters may surround the NPs to enhance proton conductivity at a relatively low RH. Hydrophilic silica NP-filled Nafion may retain stable mechanical properties at a relatively high temperature at an optimal hydrophilic silica NP loading. However, NP agglomeration and membrane brittleness may occur at higher, non-optimal loadings.

Conventionally, silica NPs have been added to membranes such as Nafion to leverage the hydrophilic properties of certain silica NPs. The use of hydrophilic silica NPs compensate for the deterioration in the hydrophilic property of the membrane at a relatively high temperature. However, membranes with silica NPs have not been realized to compensate for a deficiency in the hydrophobic properties of the membrane at relatively elevated temperatures and/or relatively lower RHs. What is needed are composite membranes for fuel cells that include hydrophobic particles (e.g. inorganic NPs) that maintain the hydrophobic properties of the membrane at relatively elevated temperatures and/or relatively lower RHs.

In one embodiment, the polymer electrolyte membrane base material is a perfluorosulfonic acid (PFSA) polymer material (e.g. Nafion). Nafion itself has hydrophilic and hydrophobic constituents. A heterogeneous structure of fluorocarbon crystallites and ionic hydrophilic clusters may create irregularly shaped water aggregates configured to provide a percolation path for proton transport. It may be difficult to preserve this water network under relatively high temperature and/or relatively low RH. Increasing the operation temperature above about the normal operating temperatures may activate α-relaxation modes in Nafion corresponding to motion of cluster aggregates of side chains. The disruption of these polar cages is accompanied by water evaporation negatively impacting membrane transport properties. Other modes of degradation including decomposition of $SO_3H$ and backbone polymer relaxation are typically observed later at about 170° C.

In one or more embodiments, this reshaping at higher temperatures may be controlled through interfacial engineering through nanoscale confinement and interfacial energies. A composite membrane with both hydrophilic and hydrophobic inorganic particles (e.g. first and second silicas with hydrophilic and hydrophobic inorganic particles) may provide superior performance at higher temperatures and/or lower RHs. The hydrophilic surface property may improve the mechanical, thermal, and transport properties of the membrane base material (e.g. Nafion) at higher operating temperatures. Differential scanning calorimetry (DSC) analysis shows that the interaction between $SO_3H$ and $SiO_2$ improves the thermal stability of $SO_3H$ and increases the enthalpy of α-relaxation events. The dynamic cross-links introduced by the hydrophilic inorganic material maintains large storage and loss moduli at high temperatures. The restricted chain mobility and the stability of hydrophilic cages at high temperatures enables stable percolation network of water for proton transport. Furthermore, the hydrophilic nature of silica may improve water uptake and water retention. In one or more embodiments, the addition of particles with a hydrophobic surface property to a membrane base material provides better performance at higher temperatures and/or lower humidity. The hydrophobic particles may be disposed within the membrane base material to provide hydrophobic nanoscale confinement of the membrane base material.

In one or more embodiments, a composite fuel cell polymer electrolyte membrane including a polymer electrolyte membrane base material including first and second inorganic particles. The first and second inorganic particles are interspersed within the organic membrane base material and each other. Such interspersion may create a mixture within a thickness portion of the membrane base material. The thickness portion may not include any discrete thickness in which only one or the other of the first and second inorganic particles are located with the discrete thickness. The hydrophobic and hydrophilic particles may be commingled with each other within the polymer electrolyte membrane base material to produce a confinement dimension between the first and second inorganic particles.

The first and second inorganic particles having first and second surface properties. The first inorganic particles may be hydrophobic inorganic particles (e.g. NPs) and the second inorganic particles may be hydrophilic inorganic particles (e.g. NPs). In one or more embodiments, these composite fuel cell polymer electrolyte membranes are configured to withstand a relatively high temperature range and/or a relatively low range of RHs while performing reasonably well in the opposite conditions of a relatively lower temperature range and a relatively higher range of RH. The relatively high temperature range may be any of the following values or in a range of any two of the following values: 90, 95, 100, 105, 110, 115, 120 and 125° C. The relatively low range of RHs may be any of the following values or in a range of any two of the following values: 0, 5, 10, 15, 20, 25, 30, 35, 40, 45 and 50%. Over the expanded operating condition ranges, the composite fuel cell membrane achieves relatively high water retention with stable mechanical characteristics and dimensions.

The hydrophobic inorganic NPs favorably interact with the polymer backbone of the membrane base material to provide nanoscale physical crosslinking to hinder relatively high temperature relaxations of the backbone. This favorable interaction reduces the propensity of the membrane base material to delaminate from a support in the case of Nafion including ePTFE or a base membrane material experiencing mechanical failure.

Figure 1:
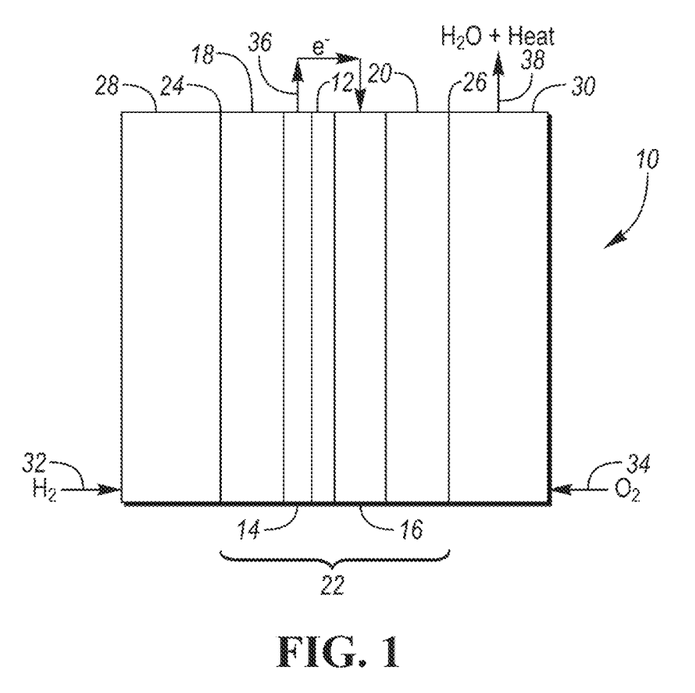
FIG. 1 depicts a schematic, side view of a fuel cell.

FIG. 1 depicts a schematic, side view of fuel cell 10. Fuel cell 10 can be stacked to create a fuel cell stack. Fuel cell 10 includes polymer electrolyte membrane (PEM) 12, anode 14, cathode 16 and first and second gas diffusion layers (GDLs) 18 and 20. The thickness of PEM 12 may be any of the following values or in a range of any two of the following values: 5, 6, 7, 8, 9, 10, 20, 30, 40, 50, 60, 70, 80, 90, 100, 110, 120, 130, 140, 150, 160, 170, 180, 190 and 200 microns. In one or more embodiments, PEM 12 is formed of a composite fuel cell polymer electrolyte membrane as described herein. PEM 12 is situated between anode 14 and cathode 16. Anode 14 is situated between first GDL 18 and PEM 12 and cathode 16 is situated between second GDL 20 and PEM 12. PEM 12, anode 14, cathode 16 and first and second GDLs 18 and 20 comprise membrane electrode assembly (MEA) 22. First and second sides 24 and 26 of MEA 22 is bounded by flow fields 28 and 30, respectively. Flow field 28 supplies $H_2$ to MEA 22, as signified by arrow 32. Flow field 30 supplies $O_2$ to MEA 22, as signified by arrow 34. A catalyst material, such as platinum, is used in anode 14 and cathode 16.

Figure 2:
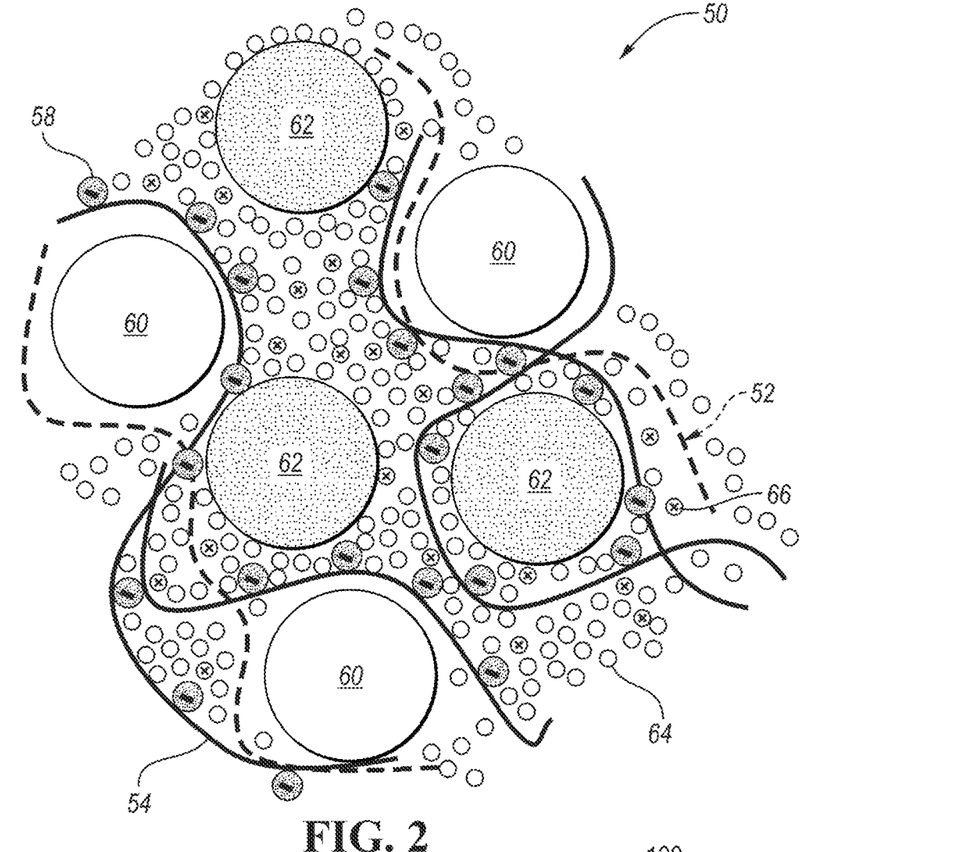
FIG. 2 depicts a magnified, schematic view of a fragment of a composite fuel cell polymer electrolyte membrane.

FIG. 2 depicts a magnified, schematic view of a fragment of composite fuel cell polymer electrolyte membrane 50. Fuel cell polymer electrolyte membrane 50 is a Nafion-type fuel cell polymer electrolyte membrane. Membrane 50 includes polymer backbone 52 (e.g. polytetrafluoroethylene (PTFE)). Membrane 50 may also include polymer chain monomers 54 (e.g., chain perfluorosulfonic acid (PFSA) monomers). In one or more embodiments, the chain PFSA monomers may include one or more short chain PFSA monomers having an equivalent weight (EW) of any of the following values or in a range of any two of the following values: 200, 300, 400, 500, 600, 700, 800, 900, 1,000 and 1,100 EW. In one or more embodiments, short chain PFSA monomers with a relatively low equivalent weight are used in the formation of a PFSA polymer material (e.g. Nafion). While a PFSA polymer material with short chain PFSA monomers with a relatively low equivalent weight may suffer from low mechanical properties, when used in combination with hydrophobic and hydrophilic particles within a membrane, the PFSA polymer material may exhibit requisite mechanical properties and provide improved proton transport. In one or more embodiments, short chain PFSA monomers in a range of 700 to 800 EW can be used in connection with hydrophobic and hydrophilic particles within a membrane to achieve this benefit.

Membrane 50 also includes sulfonic acid groups 58 configured to make membrane 50 highly conductive. As shown in FIG. 2, hydrophobic inorganic particles 60 and hydrophilic inorganic particles 62 are interspersed within membrane 50. Accordingly, the embodiment shown in FIG. 2 provides a combination of two inorganic particles having a different surface property. Water contact angle can be used to characterize a surface as hydrophilic or hydrophobic (e.g. the surfaces of hydrophobic inorganic particles 60 and hydrophilic inorganic particles 62). Hydrophilicity may mean a tendency for a surface to be wetted by water. Hydrophobicity may mean a tendency for a surface to repel water. The contact angle may be the angle where a liquid-vapor interface meets a solid surface. The contact angle can be used to quantify the wettability of a solid surface (e.g., a stainless steel alloy surface) by a liquid (e.g., water) via the Young equation:

$$\gamma_{SG} - \gamma_{SL} - \gamma_{LG} \cos \theta_C = 0 \quad (1)$$

where $\gamma_{SG}$ is the solid-vapor interfacial energy, $\gamma_{SL}$, is the solid-liquid interfacial energy, $\gamma_{LG}$ is the liquid-vapor interfacial energy (e.g., the surface tension), and $\theta_C$ is the contact angle. In one embodiment, if a water contact angle is less than 90°, then the surface property is considered hydrophilic, and if the water contact angle is greater than or equal to 90°, then the surface property is considered hydrophobic. In other embodiments, if the water contact angle is less than 60° (e.g. 0 to 60°), then the surface property is considered hydrophilic, and if the water contact angle is greater than or equal to 100° (e.g. 100 to 170°), then the surface property is considered hydrophobic.

Hydrophobic inorganic particles 60 and hydrophilic inorganic particles 62 are commingled with each other to create a confinement dimension between the particles. The confinement dimension may be any of the following values or in a range of any two of the following values: 3, 4, 5, 6, 7, 8, 9 and 10 nanometers. The confinement dimension provides hydrophobic confinement configured to stabilize polymer backbone 52 in addition to the benefits of hydrophilic confinement. The hydrophobic confinement may have one or more of the following benefits: reduction in film swelling, tapering of water uptake at high water activity and/or minimizing the coupling between water uptake and water activity. The composite membrane 50 forms water aggregates 64 configured to provide a percolation path for proton charge carriers 66.

Figure 3:
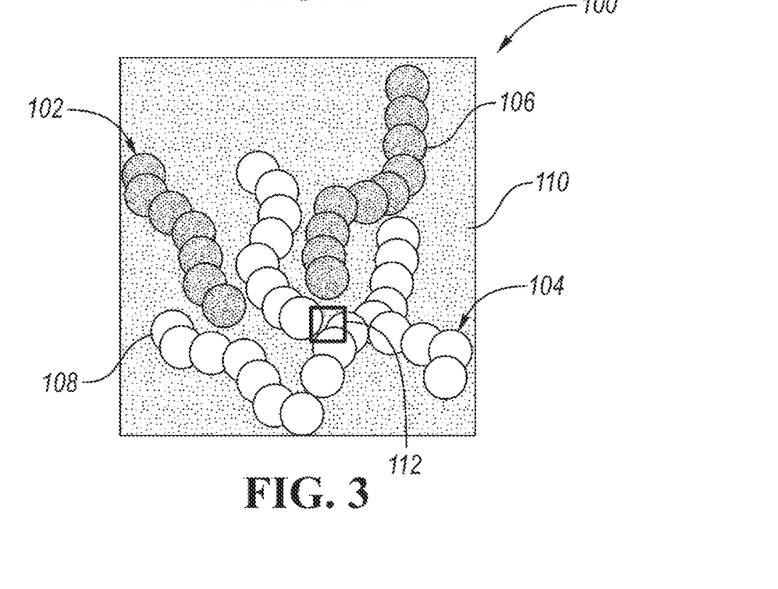
FIG. 3 depicts a magnified, schematic view of a fragment of a composite fuel cell polymer electrolyte membrane including first and second chains of first and second inorganic particles, respectively.

FIG. 3 is a magnified, schematic view of a fragment of showing composite fuel cell polymer electrolyte membrane 100 including first and second chains 102 and 104 of first and second inorganic particles 106 and 108 interspersed within membrane base material 110. In other embodiments, first and/or second inorganic particles may form aggregates or mesostructures. Membrane base material 110 may be a Nafion-type material including PFSA and ePTFE. In one or more embodiments, first inorganic particles 106 have a hydrophilic surface property and second inorganic particles 108 have a hydrophobic surface property. First and second inorganic particles 106 and 108 may be silica particles or silica nanoparticles. The ends of the chains form confinement dimension between the first and second inorganic particles 106 and 108. The confinement dimension may be any of the following values or in a range of any two of the following values: 3, 4, 5, 6, 7, 8, 9 and 10 nanometers. When first and second inorganic particles 106 and 108 have hydrophobic and hydrophilic surface properties, the confinement dimension provides hydrophobic confinement configured to stabilize the polymer backbone of membrane base material 110 as compared to only hydrophilic confinement.

Figure 4A:
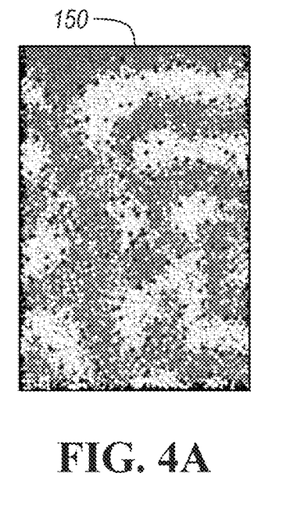
FIGS. 4A, 4B and 4C depict first, second and third course-grained models simulating a Nafion membrane material having (1) no confinement, (2) only hydrophobic confinement, and (3) dual hydrophobic and hydrophilic confinement, respectively.
Figure 4B:
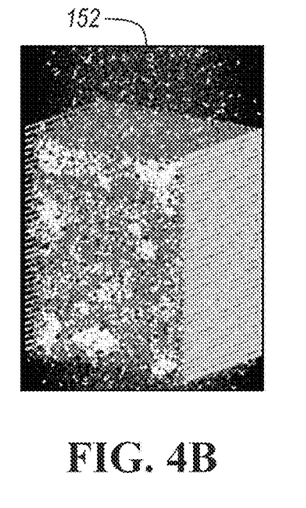
Figure 4C:
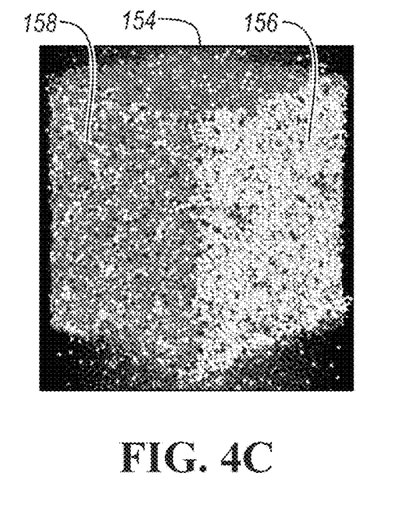

As shown in FIGS. 4A, 4B and 4C, course-grained models 150, 152 and 154 are depicted for a Nafion membrane material having (1) no confinement, (2) only hydrophobic confinement and (3) dual hydrophobic and hydrophilic confinement, respectively. The course-grained models 150, 152 and 154 were produced using a coarse-grained molecular dynamics (MD) simulation tool. The lightest particles signify water. The grey particles signify Nafion. The darkest particles signify sulfonic groups. The coarse grained Nafion/water models are configured to mimic the behavior of Nafion under varying degrees of relative humidity. In one or more embodiments, the course-grained models 150, 152 and 154 are used to optimize water uptake behavior and membrane mechanical stability of Nafion-silica composites in a confined nanostructure. Course-grained model 154 models the confinement area of FIG. 2 or 3 where two hydrophilic particles are opposite each other, while at a right angle to two hydrophobic particles. Course-grained model 154 of dual hydrophobic and hydrophilic confinement shows improved water adsorption at hydrophilic wall 156 (a two dimensional approximation of the spherical hydrophilic particles shown in FIGS. 2 and 3) as opposed to hydrophobic wall 158 (a two dimensional approximation of the spherical hydrophobic particles shown in FIGS. 2 and 3) and increases the effective water retention. Local water aggregates are configured to provide transport conduits for protons at relatively low RH and/or add secondary cross-linking effect to chain polymer chain mobility by attracting sulfonic groups.

Figure 5:
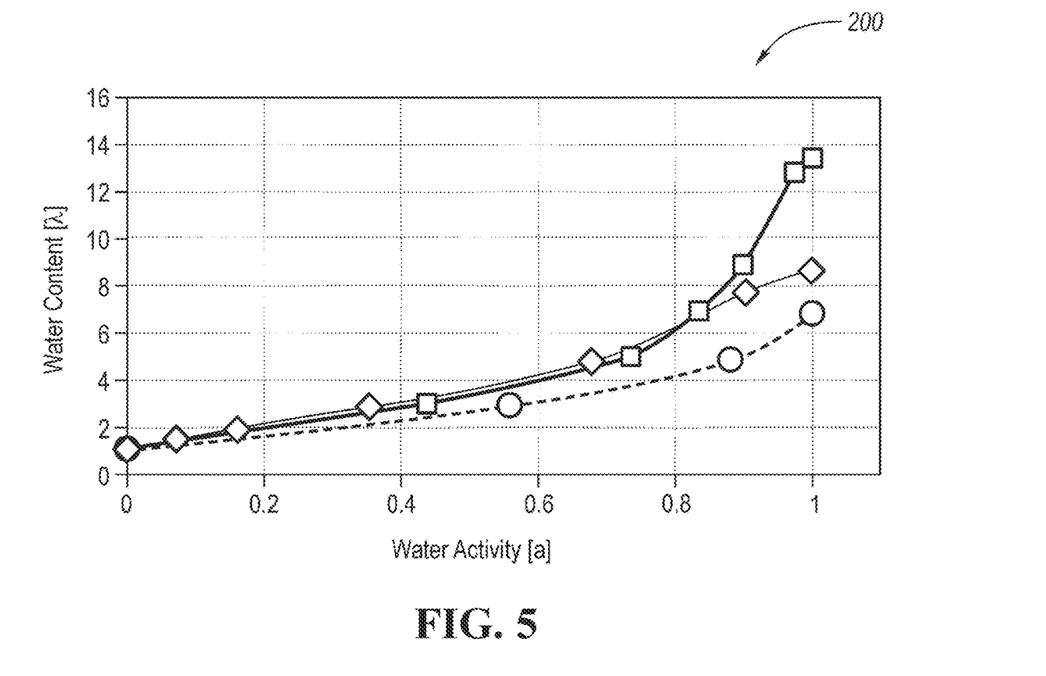
FIG. 5 depicts a graph of water uptake curves for simulated first, second and third course-grained models (no confinement, only hydrophobic confinement, and dual hydrophobic and hydrophilic confinement.

FIG. 5 depicts graph 200 of water uptake curves for course-grained model 150 (no confinement), course-grained model 152 (only hydrophobic confinement) and course-grained model 154 (dual hydrophobic and hydrophilic confinement). Graph 200 plots water content ($\lambda$) as a function of water activity (a). Water uptake gradually increases to a water content ($\lambda$) of about 6 at a water activity (a) of about 0.8. With respect to course-grained model 150 (no confinement), the value of water content ($\lambda$) overshoots to about 16 at a high activity of water. The excessive increase in water content ($\lambda$) causes flooding and excessive membrane swelling in the course-grained model 150 (no confinement). Cycling water content at near high water content ($\lambda$) values may eventually cause mechanical failure of the membrane and delamination. The curve for course-grained model 154 (dual confinement) shows a flattening of the water uptake curve, thereby improving membrane dimensional stability. This is reflected in tapering the water uptake curve, where water content ($\lambda$) is limited to less than about 6 for the entire water activity range. This is reflected in reduced membrane swelling. As also shown in FIG. 5, the increased water content took place at lower water activity, surpassing the unconfined membrane. Concurrently, water uptake at high water activity is significantly reduced, suppressing flooding and excessive membrane swelling.

The precise adjustment of the hydrophilic content in the confining wall can be utilized to tailor of water uptake. The loading of the hydrophilic and hydrophobic particles into the membrane base material may be any of the following weight percentages or in a range of any two of the following weight percentages: 1, 2, 3, 4, 5, 6, 7, 8, 9 and 10 weight percent. These relatively low loadings and the availability of different solvent chemistries for silica improve structural homogeneity of the loaded silica particles. The ratio of hydrophilic particles to hydrophobic particles or vice versa within the loading weight percentage may be any of the following values or in a range of any two of the following values: 1:5, 1:4, 1:3, 1:2 and 1:1.

Figure 6:
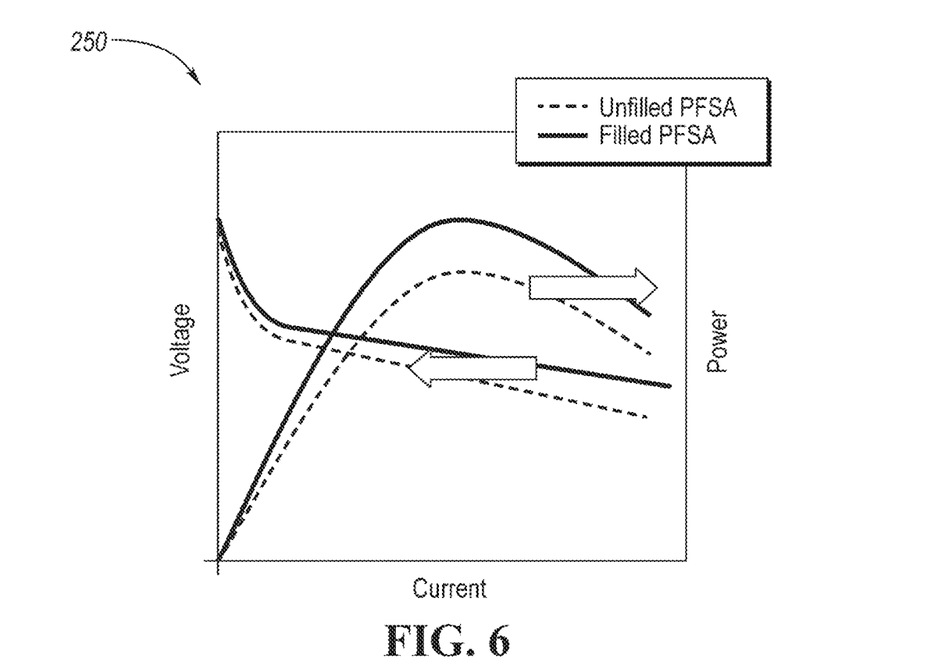
FIG. 6 depicts a graph showing voltage and power curves as a function of current for a Nafion membrane (1) interspersed with hydrophobic and hydrophilic particles interspersed therein and (2) without hydrophobic or hydrophilic particles.

FIG. 6 depicts graph 250 showing voltage and power curves as a function of current for a PFSA membrane (1) interspersed with hydrophobic and hydrophilic particles and (2) without hydrophobic or hydrophilic particles. Curve 252 depicts voltage versus current for a PFSA membrane material without hydrophobic or hydrophilic particles. Curve 254 depicts voltage versus current for a PFSA membrane interspersed with hydrophobic and hydrophilic particles. Curve 256 depicts power versus current for the PFSA membrane material without hydrophobic or hydrophilic particles. Curve 258 depicts power versus current for the PFSA membrane interspersed with hydrophobic and hydrophilic particles. As can be seen, the PFSA membrane interspersed with hydrophobic and hydrophilic particles curves show an increase in voltage and power over the PFSA membrane without hydrophobic and hydrophilic particles.

Figure 7:
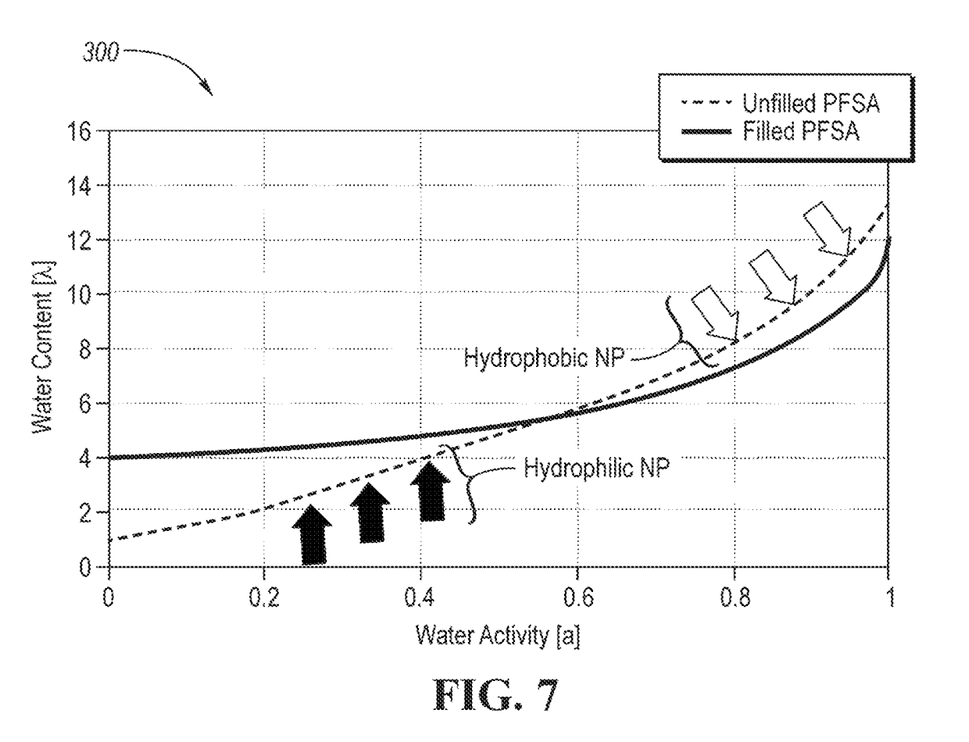
FIG. 7 depicts a graph showing water content ($\lambda$) versus water activity (a) for a Nafion membrane (1) interspersed with hydrophobic and hydrophilic particles interspersed therein and (2) without hydrophobic or hydrophilic particles.

FIG. 7 is a graph 300 showing water content ($\lambda$) versus water activity (a) for a Nafion membrane (1) interspersed with hydrophobic and hydrophilic particles; and (2) without hydrophobic or hydrophilic particles. As shown in graph 300, the hydrophilic particles push up the water content ($\lambda$) at water activity (a) levels of about 0.6 and below, thereby beneficially increasing water content, and the hydrophobic particles push down water content ($\lambda$) at water activity (a)

levels of about 0.6 and above, thereby reducing membrane swelling, relative to the PFSA membrane without hydrophobic and hydrophilic particles.

The results shown in FIGS. 5 through 7 demonstrate a more stable PFSA membrane for an extended range of RH. The transport properties of membrane composites of one or more embodiments show significant improvement, especially at relatively higher temperatures of about 110° C. or higher, even though conventionally such transport properties cannot be achieved because of compromised mechanical stability. In one or more embodiments, hydrophilic inorganic particles helps retain water and sustain polar cages configured to provide a percolating path for proton transport, while the hydrophobic inorganic particles can enhance the mechanical properties by restricting the backbone degrees of freedom at a relatively high temperature. Taken together, these two components provide a solution for operation of a fuel cell outside of typical operating conditions.

In one or more embodiments, silica particles are used as the hydrophilic and hydrophobic inorganic particles interspersed within the membrane base material. Silica particles may be used in various nanoscale structures, e.g. NP, hierarchical, mesoporous, etc. Different methods can be utilized to incorporate the hydrophilic and hydrophobic particles into the membrane base material. Non-limiting examples of such processes include physical mixing, sol-gel, etc. Various chemistries can be utilized to functionalize the surface of the silica to impart different surface properties (i.e. hydrophobic or hydrophilic surface properties. Non-limiting examples of such chemistries include PFD ($(CH_2)_2(CF_2)_9CF_3$), ODF (oligomer poly(hexafluoroisopropylidene-diphenyl-co-1,3, 4-oxadiazoleediphenylether), and $PO_3H_2$. Synthesizing processes may include fumed silica nanoparticles (e.g. treated and pristine), MSUF-$SiO_2$ mesoporous structure, and tetraethoxysilane (TEOS) silica self-assembly. Fumed silica nanoparticles are available under the Aerosol brand. The synthesizing process may be tailored based on the nanoscale features that are wanted for specific Nafion-silica composites.

In one or more embodiments, the mean particle size of the silica particles may be any of the following values or in a range of any two of the following values: 5, 10, 15, 20, 25, 30, 35, 40, 45 and 50 nanometers. The silica particles in this size range may be fumed silica particles. The fumes silica particles are available under the Aerosil brand. The fumed silica particles may be manufactured using continuous flame hydrolysis of a substance such as silicon tetrachloride ($SiCl_4$). In the flame, hydrogen and oxygen (from the air) are reacted in the presence of $SiCl_4$ to generate silica and hydrochloric acid.

In one or more embodiments, the silica particles may have a pore size of any of the following values or in a range of any two of the following values: 5, 6, 7, 8, 9 and 10 nanometers. The silica particles having one of these pore sizes may have a mean particle size of any of the following values or in a range of any two of the following values: 90, 95, 100, 105 and 110 nanometers. Mesoporous silica particles (e.g. MSU-F (cellular foam) and MCM (hexagonal order) may be used in one or more embodiments. Mesoporous silica sub-microspheres can be prepared by dissolving hexadecyltrimethyl ammonium bromide (CTAB, 99%) (0.8 g) and NaOH aqueous solution (3.5 mL, 2 M) in 480 mL of water and stirring at 80° C. for 40 min. Tetraethyl orthosilicate (TEOS, 98%) (5 mL) can then be added to react at 80° C. for 3 hours more with constant stirring. Mesoporous silica sub-microspheres with CTAB as templates (CTABeSiO2) can be obtained in ethanol (ethanol purification), and dried in a vacuum oven at room temperature until a constant weight is achieved.

In one or more embodiments, the silica particles may be subjected to a surface treatment to impart a surface property (i.e., hydrophobic or hydrophilic). For instance, fumed silica particles may be treated with silanol groups (SiOH) to render the surface of the silica particles hydrophilic. In addition, hydrophilic activation can be achieved using plasma etching and the introduction of hydroxyl anchor groups on silica surface. Post-treatment steps can be carried out to transform the hydrophilic silica particles into hydrophobic nanostructures. In one embodiment, hydrophobic fumed silica is coated with $SiC_nH_m$ functional groups. Carbon based coating is expected to achieve moderate levels of hydrophobicity (e.g. contact angles of 90° to 120°.

In another embodiment, hydrophobic silica may be obtained by using perfluorosilane molecules. Application of a perfluorosilane hydrophobic coating can be achieved though the sonication and mixing of silica with 5% toluene solution of the fluorine based molecule and baking the coated silica for about 1 hour at 120° C. in air. In another embodiment, the fluorine-based perfluorosilane molecule can be applied using molecular vapor deposition, where it is heated in vacuum to about 50° C. and deposited on silica at room temperature. The presence of water vapor assists in achieving the surface mobility for molecular self-assembly of the perfluorosilane. Optionally, the silica surface is primed with oxygen plasma to induce the formation of silanol groups. The fluorine-based perfluorosilane molecules are expected to achieve high levels of hydrophobicity (e.g. contact angles of 120° to 170° depending on the number of fluorine atoms in the molecule.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:
1. A composite fuel cell polymer electrolyte membrane comprising:
    a polymer electrolyte membrane base material including first and second inorganic particles, the first and second inorganic particles interspersed within the polymer electrolyte membrane base material and each other, the first and second inorganic particles having first and second surface properties, and the first surface property is hydrophobicity and the second surface property is hydrophilicity.

2. The composite fuel cell polymer electrolyte membrane of claim 1, wherein the first inorganic particles are first silica nanoparticles and the second inorganic particles are second silica nanoparticles.

3. The composite fuel cell polymer electrolyte membrane of claim 1, wherein the polymer electrolyte membrane base material is an organic polymer electrolyte membrane base material.

4. The composite fuel cell polymer electrolyte membrane of claim 3, wherein the organic polymer electrolyte membrane base material is a fluorinated organic polymer electrolyte membrane base material.

5. The composite fuel cell polymer electrolyte membrane of claim 4, wherein the fluorinated organic polymer electrolyte membrane base material is a perfluorosulfonic acid (PFSA) polymer material.

6. The composite fuel cell polymer electrolyte membrane of claim 5, wherein the PFSA polymer material includes an expanded polytetrafluoroethylene (ePTFE).

7. The composite fuel cell polymer electrolyte membrane of claim 5, wherein the PFSA polymer material includes one or more short chain PFSA monomers having an equivalent weight of 700 to 800 EW.

8. A composite fuel cell polymer electrolyte membrane comprising:
a polymer electrolyte membrane base material having a polymer backbone and including first and second inorganic particles, the first and second inorganic particles commingled within the polymer electrolyte membrane base material to produce a confinement dimension of 3 to 10 nm between the first and second inorganic particles, the first and second inorganic particles having first and second surface properties, and the first surface property is different than the second surface property, the first surface property is hydrophobicity and the second surface property is hydrophilicity, the confinement dimension including hydrophobic and hydrophilic confinement configured to stabilize the polymer backbone of the polymer electrolyte membrane base material.

9. The composite fuel cell polymer electrolyte membrane of claim 8, wherein the first inorganic particles are first silica nanoparticles and the second inorganic particles are second silica nanoparticles.

10. The composite fuel cell polymer electrolyte membrane of claim 8, wherein a first portion of the first inorganic particles form a first chain of the first inorganic particles, the first chain having a first end, a second portion of the second inorganic particles forming a second chain of the second inorganic particles, the second chain having a second end, and the confinement dimension is situated between the first and second ends.

11. The composite fuel cell polymer electrolyte membrane of claim 8, wherein a first portion of the first inorganic particles form a first aggregation of the first inorganic particles, a second portion of the second inorganic particles forming a second aggregation of the second inorganic particles, and the confinement dimension is situated between the first and second aggregations.

12. The composite fuel cell polymer electrolyte membrane of claim 8, wherein a first portion of the first inorganic particles form a first mesostructure of the first inorganic particles, a second portion of the second inorganic particles forming a second mesostructure of the second inorganic particles, and the confinement dimension is situated between the first and second aggregations.

13. The composite fuel cell polymer electrolyte membrane of claim 8, wherein the polymer electrolyte membrane base material is a perfluorosulfonic acid (PFSA) polymer material.

14. A polymer electrolyte membrane fuel cell comprising:
an anode;
a cathode; and
a polymer electrolyte membrane situated between the anode and cathode, the polymer electrolyte membrane including a polymer electrolyte membrane base material including first and second inorganic particles, the first and second inorganic particles interspersed within the polymer electrolyte membrane base material and each other, the first and second inorganic particles having first and second surface properties, the first surface property is different than the second surface property, and the first inorganic particles are first silica nanoparticles and the second inorganic particles are second silica nanoparticles.

15. The polymer electrolyte membrane fuel cell of claim 14, wherein the first and second inorganic particles commingled within the polymer electrolyte membrane base material to produce a confinement dimension between the first and second inorganic particles.

16. The polymer electrolyte membrane fuel cell of claim 15, wherein a first portion of the first inorganic particles form a first aggregation of the first inorganic particles, a second portion of the second inorganic particles forming a second aggregation of the second inorganic particles, and the confinement dimension is situated between the first and second aggregations.

17. The polymer electrolyte membrane fuel cell of claim 15, wherein a first portion of the first inorganic particles form a first mesostructure of the first inorganic particles, a second portion of the second inorganic particles forming a second mesostructure of the second inorganic particles, and the confinement dimension is situated between the first and second aggregations.

18. The polymer electrolyte membrane fuel cell of claim 14, wherein the first surface property is hydrophobicity and the second surface property is hydrophilicity.

19. The polymer electrolyte membrane fuel cell of claim 14, wherein the polymer electrolyte membrane base material is a perfluorosulfonic acid (PFSA) polymer material.

20. The polymer electrolyte membrane fuel cell of claim 19, wherein the PFSA polymer material includes an expanded polytetrafluoroethylene (ePTFE).

* * * * *